US 011445235 B2

(12) United States Patent
Schwartz

(10) Patent No.: US 11,445,235 B2
(45) Date of Patent: Sep. 13, 2022

(54) DETERMINING CONTEXT TO INITIATE INTERACTIVITY

(71) Applicant: Comcast Cable Communications, LLC, Philadelphia, PA (US)

(72) Inventor: Samuel Schwartz, Penn Valley, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 16 days.

(21) Appl. No.: 15/791,936

(22) Filed: Oct. 24, 2017

(65) Prior Publication Data

US 2019/0124388 A1    Apr. 25, 2019

(51) Int. Cl.
*H04N 21/422* (2011.01)
*H04N 21/472* (2011.01)
*G06F 3/16* (2006.01)
*H04N 21/439* (2011.01)

(52) U.S. Cl.
CPC ....... *H04N 21/42203* (2013.01); *G06F 3/167* (2013.01); *H04N 21/4394* (2013.01); *H04N 21/47202* (2013.01); *H04N 21/47217* (2013.01); *H04N 21/472* (2013.01)

(58) Field of Classification Search
CPC ....... H04N 21/42203; H04N 21/47217; H04N 21/472; H04N 21/4394; H04N 21/47202; G06F 3/167
See application file for complete search history.

(56) References Cited

U.S. PATENT DOCUMENTS

| | | | | |
|---|---|---|---|---|
| 2006/0259930 | A1* | 11/2006 | Rothschild | G11B 27/11 725/81 |
| 2011/0184730 | A1* | 7/2011 | LeBeau | G10L 15/30 704/201 |
| 2012/0159535 | A1* | 6/2012 | Gratton | H04N 21/4722 725/32 |
| 2013/0347018 | A1* | 12/2013 | Limp | H04N 21/4826 725/19 |
| 2014/0136205 | A1* | 5/2014 | Jang | H04L 12/282 704/249 |
| 2017/0262051 | A1* | 9/2017 | Tall | G06F 3/167 |

\* cited by examiner

*Primary Examiner* — Nicholas T Corbo
(74) *Attorney, Agent, or Firm* — BakerHostetler

(57) ABSTRACT

Methods and systems are disclosed for executing a voice command based on and association of the voice command and one or more identifiers. Audio data associated with a content asset may be received at a user device such as a voice activated device. A voice command may also be received at the user device. One or more identifiers associated with the audio data, such as a content or product identifier, may be determined. The identifiers may be determined based on playback of the content asset or may be received in response to a request generated by the user device. One or more operations capable of being executed by the user device may be determined and initiated or executed by the user device based on the one or more identifiers and the received voice command.

27 Claims, 9 Drawing Sheets

DETERMINING CONTEXT TO INITIATE INTERACTIVITY

BACKGROUND

Voice activated devices may be controlled using audio data such as vocal instructions or utterances from a user. A given voice activated device may be configured to receive an audio signal comprising a trigger and a voice command, and verification of the trigger may cause the voice activated device to output a response based on the received voice command. However, it may be desirable to recognize context and environmental factors associated with a voice command in order to enhance the accuracy of the voice activated device in responding to the voice command. These and other shortcomings are addressed in the disclosure.

SUMMARY

In one aspect, methods and systems are disclosed for executing a voice command based on one or more identifiers. Audio data associated with a content asset may be received at a user device such as a voice activated device. A voice command that is separate from the audio data may also be received at the user device. One or more identifiers associated with the audio data, such as a content identifier or an audio watermark, may be determined. The identifiers may be determined based on playback of the content asset or may be received at the user device from a playback device. The identifiers may be sent to the user device in response to a request generated by the user device, or may be pushed to the user device based on a predetermined conditions. One or more operations capable of being executed by the user device may be determined and executed by the user device based on the one or more identifiers and the received voice command. These and other embodiments are further explained below.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings.

DETAILED DESCRIPTION

Methods and systems are disclosed for determining one or more executable operations based on a voice command and one or more identifiers. User devices such as voice activated devices may rely on the words or sounds contained in a voice command in determining and generating an output in response to the voice command. However, it may be possible to determine context associated with one or more other audio data in order to improve the user experience. For example, the user device may be configured to receive first audio data from a first source such as from a playback device generating an audio output associated with playback of a content asset, and to receive a voice command from a second source such as a user of the device. The audio data received at the user device may comprise one or more identifiers. The user device may be configured to determine, based on the one or more identifiers and the voice command, one or more operations that are capable of being executed by the device and to execute one or more of those operations.

The one or more identifiers may be received as audio data from a nearby device such as during playback of a content asset by a playback device. For example, a television asset may reference a product or a newly released movie, each of which may be associated with an identifier such as the name of the product or the newly released movie. The voice command may be received from a user of the device and may comprise one or more keywords capable of being recognized by the device, such as "order," "play," and "record." The one or more executable operations may be determined based on the voice command and the one or more identifiers, and may include an operation to record a content asset associated with a given identifier or to order a product associated with a given identifier through an online shopping account associated with a user.

Figure 1:
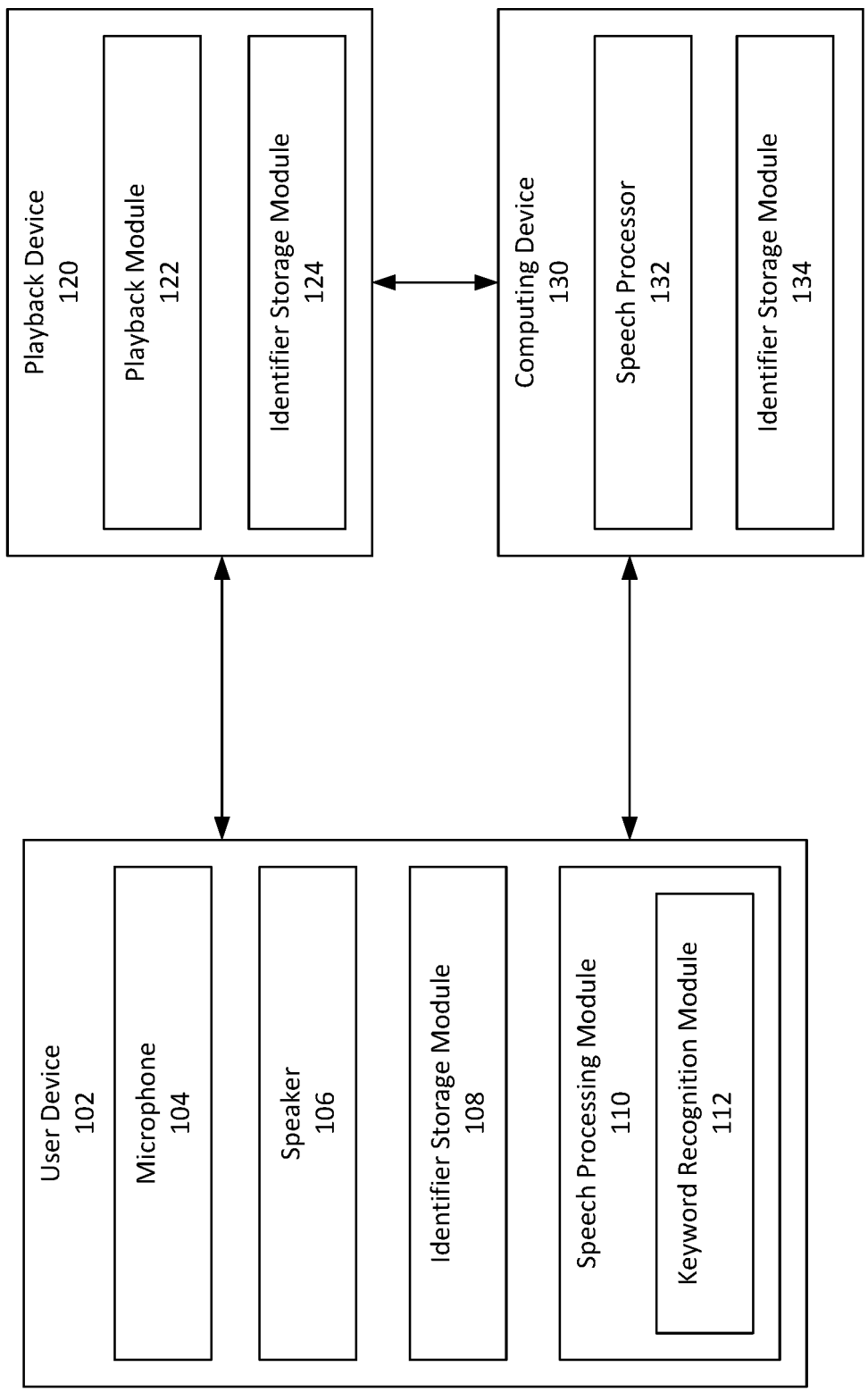
FIG. 1 is a block diagram of an example system.

An example system 100 for determining one or more executable operations is shown in FIG. 1. The system 100 may comprise a user device 102 and a playback device 120. The user device 102 may be a voice activated device configured to receive audio data generated by a user or by a nearby device such as the playback device 120. The audio data may be received by the device as an audio input. For example, the user device 102 may be configured to receive at least one of audio data associated with a content asset and a voice command spoken by a user of the device through the microphone 104. The audio data may be received, for example, during playback of the content asset by the playback device 120. The audio data and the voice command may be received by the user device 102 simultaneously or nearly simultaneously. In response to the audio data and the voice command, the user device 102 may be configured to determine one or more executable operations and to cause executions of one or more of those operations. The user device 102 may be in communication with one or more other devices such as the playback device 120 in order to execute one or more voice commands spoken by a user and that are capable of being executed by the playback device 120.

The user device 102 may be an "always-on" user device that is configured to monitor for the presence of audio signals generated by nearby devices or users of those devices. The always-on device may be configured to monitor for one or more identifiers and one or more keywords that cause the always-on device to execute some operation associated with a voice command following the keyword. In one example, the voice command may be the keyword itself and detection of the keyword by the user device 102 may cause the user device 102 to execute an operation associated with the keyword.

Additionally or alternatively, the user device 102 may be configured to enter a "sleep" mode after a certain period of time and may not monitor for one or more identifiers from nearby devices or users of those devices. During a sleep mode, the user device 102 may be configured to ignore all audio data until a keyword or other trigger is detected at the user device 102. Upon the detection of one or more recognized keywords, the user device 102 may be configured to receive one or more identifiers associated with the audio signal from an external source such as the playback device 120. The user device 102 may also be configured to interact with a user of the device through the speaker 106, such as by generating an output confirming the execution of a voice command uttered by a user of the device.

The identifier storage module 108 may be configured to store one or more identifiers associated with the audio signal. In the example that the user device 102 is an "always-on" device, the user device 102 may be configured to store one or more identifiers received as part of audio data during playback of a content asset. For example, the one or more identifiers may identify the particular content asset or one or more products presented during playback of the content asset. The user device 102 may be configured to store a plurality of identifiers associated with a given content asset. In one example, the user device 102 may be configured to store a plurality of identifiers associated with a content asset for a limited period of time, such as thirty seconds. Thus, an identifier received during playback of the content asset may be stored by the user device 102 in the identifier storage module 108 for thirty seconds before being deleted by the user device 102.

The speech processor 110 may be configured to recognize one or more words or phrases received at the user device 102 as audio data or a voice command. The speech processor 110 may comprise, for example, one or more of a speech capture module, a digital signal processor (DSP) module, a preprocessed signal storage module, and a reference speech pattern and pattern matching algorithm module. Speech processing may be done in a variety of ways and at different levels of complexity, for example, using one or more of pattern matching, pattern and feature analysis, and language modeling and statistical analysis. However, it is understood that any type of speech processing may be used, and the examples provided herein are not intended to limit the capabilities of the speech processor 110.

The speech processor may be configured with a number of keywords, such as those stored in keyword storage module 112. The keyword storage module 112 may comprise a number of keywords that are recognizable by the speech processor 110 using, for example, pattern matching, and may allow a user to interact with content presented during playback of a content asset. For example, the keyword storage module 112 may store a plurality of commonly spoken words for interacting with the content, such as "order," "play," and "record." Thus, when audio data generated as a result of playback of a content asset comprises a reference to a product, and the user device 102 receives a voice command comprising the keyword "order," the user device 102 may be configured to order the product, based on the identifier associated with the product, through an online shopping account associated with the user. Additionally or alternatively, when audio data generated as a result of playback of a content asset comprises a reference to an upcoming television series, and the user device 102 receives a voice command comprising the keyword "record," the user device 102 may be configured to instruct the playback device 120 to record the upcoming television series using the identifier associated with the upcoming television series.

The playback device 120 may comprise a playback module 122 and a user interface module 124. The playback device 120 may be configured to receive a request from a user or from a nearby device such as the user device 102 to record or play back a content asset. The playback device 120 may be, for example, a set-top box or a cellular telephone. The playback device 120 may be configured to present a content asset to a user over one or more screens or monitors. The content asset may be any type of video asset, for example, a video clip, a movie asset, a television asset, a live broadcast asset such as a sporting event, an audio asset such as music streaming, or a Video on Demand (VOD) asset. However, it is understood that the content asset may be any type of content asset having any length or duration. The content asset may be in any one of a variety of formats, such as, for example, H.264, MPEG-4 Part 2, or MPEG-2. The content asset may be transmitted using one or more standards such as SCTE 35 or other specifications.

Digital audio/video compression may be utilized for the content asset, such as MPEG, or any other type of compression. For example, in an MPEG encoded transmission, content and other data are transmitted in packets, which collectively make up a transport stream. However, the present methods and systems are not so limited, and may be implemented using other types of transmission and data.

The output of a single MPEG audio and/or video coder may be referred to as a transport stream. The transport stream may comprise one or more elementary streams. An elementary stream may be or comprise an endless near real-time signal. For convenience, the elementary stream may be broken into data blocks of manageable size, forming a packetized elementary stream (PES). These data blocks need header information to identify the start of the packets and must include time stamps because packetizing disrupts the time axis. For transmission and digital broadcasting, for example, several programs (e.g., content assets) and their associated PESs may be multiplexed into a multi program transport stream. A multi program transport stream has a program clock reference (PCR) mechanism that allows transmission of multiple clocks, one of which may be selected and regenerated at the decoder.

A multi program transport stream may comprise a multiplex of audio and video PESs. In addition to the compressed audio, video and data, a transport stream may comprise metadata describing the bit stream. Such metadata may comprise a program association table (PAT) that lists every content asset (e.g., program) in the multi program transport stream. Each entry in the PAT may point to a program map table (PMT) that lists the elementary streams making up each content asset. Some content may be unencrypted, but some content may be subject to conditional access (encryption) and this information is also carried in the metadata. The transport stream may be comprised of fixed-size data packets, for example, each containing 188 bytes. Each packet may carry a program identifier code (PID). Packets in the same elementary stream may all have the same PID, so that the decoder (or a demultiplexer) may select the elementary stream(s) it wants and reject the remainder. Packet continuity counts ensure that every packet that is needed to decode a stream is received. A synchronization system may be used so that decoders may correctly identify the beginning of each packet and deserialize the bit stream into words.

A content asset, such as a program, may be a group of one or more PIDs that are related to each other. For instance, a multi program transport stream used in digital television might contain three programs, to represent three television channels. In some example, each channel may include one video stream, one or two audio streams, and any necessary metadata. A receiver wishing to tune to a particular "channel" merely has to decode the payload of the PIDs associated with its program.

As discussed herein, the content asset may comprise one or more identifiers. The one or more identifiers may be inserted into the content asset in order to provide context for one or more features of the content asset. The one or more identifiers may be inserted into the content asset, for example, by the content provider, the set-top box, or by any device or entity capable of inserting the identifiers into the content asset. Additionally or alternatively, the user device 102 may be configured to perform content recognition processing, such as automatic content recognition (ACR), in order to determine context associated with the content asset.

The playback module 122 may be in communication with an external service provider such as a content provider in order to present playback of the content asset to the user. The playback module 122 may be in communication with a device configured to present the content asset to the user. For example, the playback module 122 may be electrically connected to a television set or may be connected to a hand-held device such as a cellular telephone through a WiFi connection in order to present the content to the user. As the content is presented on the one or more devices configured to present the content to a user, audio data may be generated that contains one or more identifiers inserted into the content asset. The audio data may be generated in the form of a sound wave that is capable of being picked up by one or more microphones. For example, the audio data and the corresponding one or more identifiers present in the audio data generated as a result of playback of the content asset may be received by the user device 102 as audio data.

The identifier storage module 124 may be configured to store one or more identifiers associated with playback of a content asset. The identifier storage module 124 may be configured to receive the identifiers from the service provider. Additionally or alternatively, the identifier storage module may be configured to determine one or more identifiers generated as a result of playback of the content asset, for example, using speech processing or an existing transcription of the content asset. The identifier storage module 124 may be configured to store the one or more identifiers and to send the one or more identifiers to the user device 102 in response to a request from the user device.

The computing device 130 may comprise a speech processor 132 and an identifier storage module 134. The computing device 130 may be configured to receive, from the user device 102, audio data such as a voice command and may generate a transcription of the voice command using the speech processor 132. Additionally or alternatively, the computing device may be configured to determine, using the identifier storage module 134, an identifier associated with the voice command based on the transcription of the voice command generated by the speech processor 132.

The speech processor 132 may be configured to recognize an audio file comprising one or more words received spoken by a user of the voice activated device and to output a transcription of the audio file. The speech processor 132 may comprise, for example, one or more of a speech capture module, a digital signal processor (DSP) module, a preprocessed signal storage module, and a reference speech pattern and pattern matching algorithm module. Speech recognition may be done in a variety of ways and at different levels of complexity, for example, using one or more of pattern matching, pattern and feature analysis, and language modeling and statistical analysis. However, it is understood that any type of speech recognition may be used, and the examples provided herein are not intended to limit the capabilities of the speech processor 132.

The identifier storage module 134 may be configured to store one or more identifiers associated with playback of a content asset. The identifier storage module 134 may be configured to receive the identifiers from the service provider. Additionally or alternatively, the identifier storage module may be configured to determine one or more identifiers generated as a result of playback of the content asset, for example, using speech processing or an existing transcription of the content asset. The identifier storage module 134 may be configured to store the one or more identifiers and to send the one or more identifiers to the user device 102 in response to a request from the user device.

Figure 2:
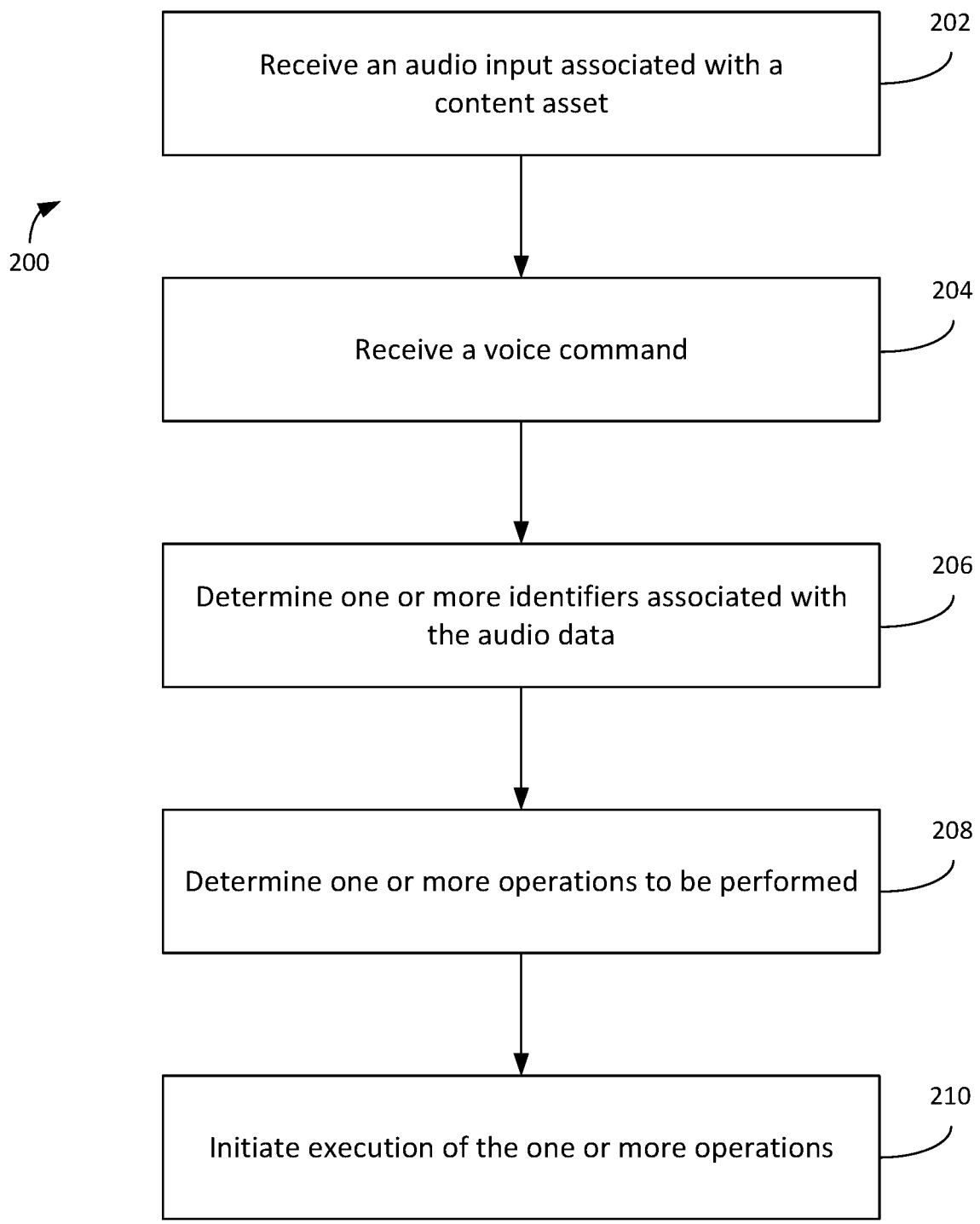
FIG. 2 is a flow chart of an example method.

FIG. 2 illustrates an example method 200 in accordance with an aspect of the disclosure. At step 202, audio data may be received. The audio data may be associated with a content asset, such as a movie, television, or audio asset. The audio data may be received at the device from a first entity, such as the playback device 120 (FIG. 1) configured to cause playback of the content asset. The audio data may be received at the user device 102 (FIG. 1) which may be a voice activated device. The user device may be an always-on device that is configured to monitor for the presence audio signals generated by nearby devices (e.g., the playback device) or users of those devices. Additionally or alternatively, the user device may be configured to enter a "sleep" mode after a certain period of time and may not "wake" until one or more keywords are detected at the user device.

At step 204, a voice command may be received at the user device. The voice command may be received at the device from a second entity. The second entity may be different from the first entity. For example, the second entity may be a user of the device uttering the voice command. The voice command may comprise one or more keywords capable of being recognized by the device. The user device may be configured to monitor for one or more keywords that cause the always-on device to execute some operation associated with the voice command. In the example that the user device enters a sleep mode, the device may be configured to wake upon the detection of the one or more keywords. The one or more keywords may be stored by the user device in the keyword storage module which may comprise a number of keywords that are recognizable by the speech processor using, for example, pattern matching, and may allow a user to interact with content presented during playback of a content asset. For example, the keyword storage module may store a plurality of commonly spoken words for interacting with the content, such as "order," "play," and "record."

At step 206, one or more identifiers associated with the audio data may be determined. The one or more identifiers may comprise, for example, at least one of an SCTE-35 packet, a unique program identifier (UID), a content identifier, or an audio watermark. In one example, the one or more identifiers may be determined using audio content recognition processing. The one or more identifiers may be received as audio data during playback of the content asset by the playback device, e.g., a television, smartphone, etc. For example, a video asset may comprise a reference to a product or a newly released movie, each of which may be associated with an identifier such as the name of the product or the newly released movie. The user device may be configured to store one or more identifiers received as part of audio data during playback of a content asset. For example, the user device may be configured to receive the identifiers from the source of the content or a service provider. Also, the user device may be configured to determine the one or more identifiers generated as a result of playback of the content asset, for example, using speech processing or an existing transcription of the content asset.

The user device may be configured to store a plurality of identifiers for a determined period of time. For example, the user device may be configured to receive an identifier and to store the identifier in the identifier storage module for a limited period of time, such as thirty seconds. In such an example, the user device may be configured to delete any identifier that has been stored in the identifier storage module for greater than thirty seconds. The user device may comprise a rolling buffer that is configured to continuously record audio data including the one or more audio signals and to delete the recorded data and audio signals after a determined period. Additionally or alternatively, the user device may be configured to start recording the audio data as soon as it hears the trigger word and before the voice command is uttered by the user.

At step 208, an association between the voice command and an identifier may be determined. In one example, the user device may be configured to store a plurality of identifiers, for example, in the identifier storage module of the user device and to determine one or more identifiers capable of being executed by the device. Determining one or more operations capable of being executed by the device may comprise determining that one or more of the identifiers associated with the audio data were received within a given time frame of the voice command. For example, a user device may receive a voice command comprising the known keyword "order."

Figure 3:
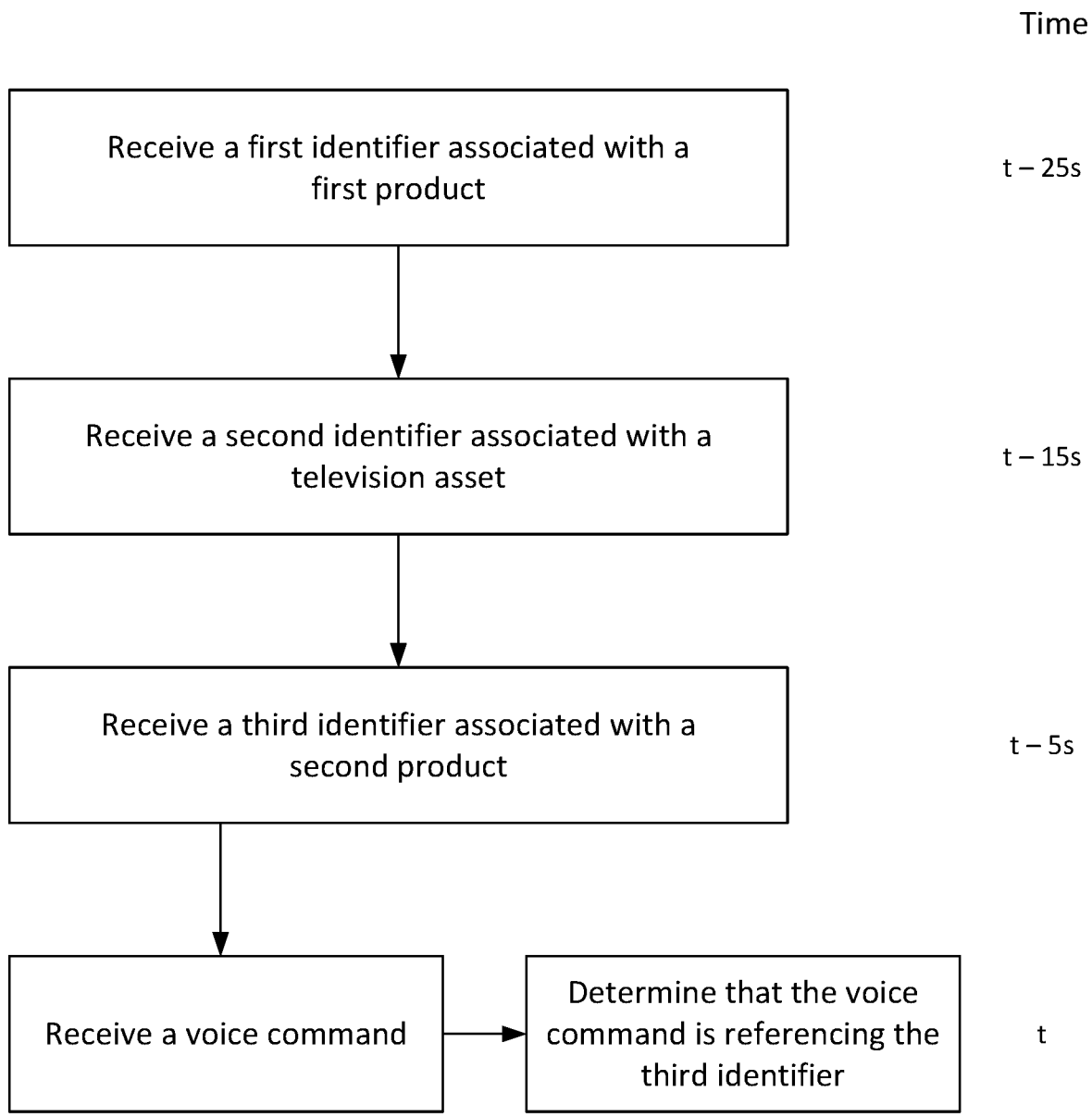
FIG. 3 is an example system operation according an aspect of the disclosure.

In one example, as shown in FIG. 3, the user device may determine that the identifier storage module comprises three identifiers in the thirty seconds prior to the voice command: a first identifier associated with a first product and received twenty-five seconds before the voice command; a second identifier associated with a television asset received fifteen seconds before the voice command; and a third identifier associated with a second product received five seconds before the voice command. The identifiers may optionally be stored in the identifier storage module. In one embodiment, the identifier storage module may locally store certain types of hierarchal identifiers. Additionally or alternatively, the identifier storage module may have access to a remote storage or processing device that can provide the identifiers. The user device may determine based on the known keyword "order" that the user wishes to place an order for either the first product associated with the first identifier or the second product associated with the third identifier. The user device may further determine, since the third identifier was received closer to the voice command than the first identifier, that the user wishes to place an order for the second product associated with the third identifier. While this example discloses three identifiers received at specified intervals, it is understood that any number of identifiers may be received over any number of intervals or time periods. For example, the user device may receive twenty identifiers over a two-minute period, and may use the timing of the received identifiers as well as other characteristics of the identifiers in order to determine context associated with the received voice command.

At step 210, execution of at least one or more of the determined operations may be initiated or executed. The user device may be configured to execute an operation determined based on the voice command at the one or more identifiers stored in the user device. In the example above, the user device may be configured to place an order for the second product associated with the third identifier through an online shopping account using stored information associated with the user. The user device may be configured to generate an audio output indicative of the one or more executable operations. For example, in response to placing an order for the second product through the home shopping network, the user device may confirm that the order was placed by generating an audio output of "order for second product has been placed."Additionally or alternatively, the user device may generate an audio output confirming the voice command before executing the one or more operations, such as by querying the user "are you sure you want to order the second product?"

Figure 4:
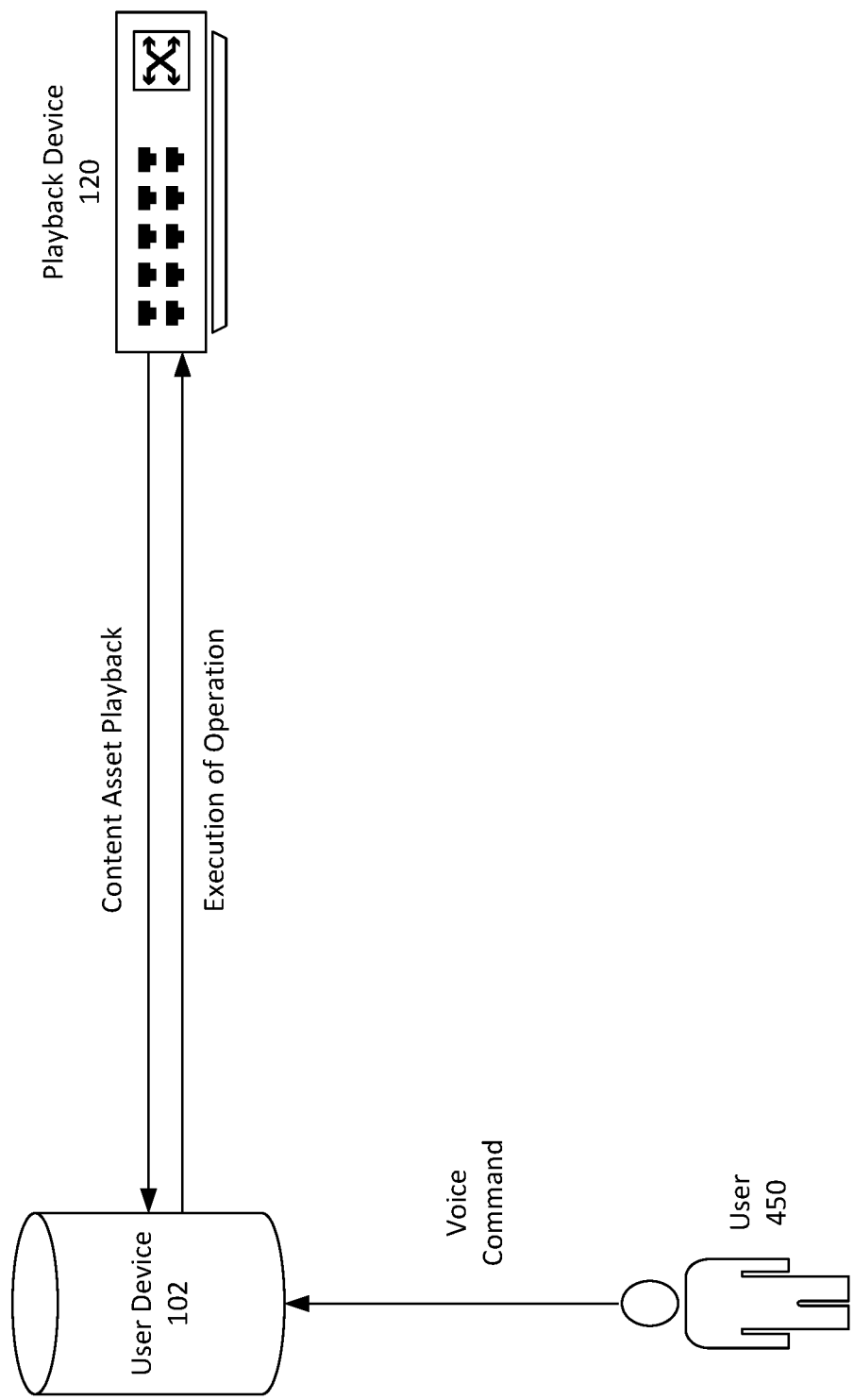
FIG. 4 is a flow chart of an example method.

FIG. 4 shows an example system implementation according to an aspect of the disclosure. The playback device 120 may be configured to play back a content asset, such as a movie, television or audio asset. The playback device may be in communication with a service provider such as a content or service provider and may in connection with a television or other monitor in order to display the content asset to a user, such as user 450. The user device 102, which may be a voice activated device, may be configured to monitor for the presence of audio signals in a nearby area, such as the audio signals corresponding to playback of the content asset by the playback device 120. In this example, the user device may be an always-on voice activated device that is configured to monitor for the presence of audio signals generated by nearby devices or users of those devices. However, it is understood that the user device may be any type of device. The audio signals received from the playback device may comprise one or more identifiers corresponding, for example, to a particular content asset or one or more products presented during playback of the content asset. The user device may be configured to store the one or more identifiers in an identifier storage module of the user device for a certain period of time, such as thirty seconds.

The user device may be configured to receive a voice command from the user. The voice command may comprise one or more keywords that are capable of being recognized by the user device using speech recognition processing such as pattern matching. In response to receipt of the voice command, the user device may be configured to determine whether the identifier storage module associated with the user device comprises one or more identifiers. For example, the user device may receive a voice command comprising the keyword "record" and may determine that the identifier storage module comprises one or more identifiers associated with content that is capable of being recorded. In response to determining that the identifier storage module does comprise one or more identifiers associated with content that is capable of being recorded, the user device may instruct the playback device to record the content associated with the identifier. In one example, the user device may be configured to instruct one or more other playback devices capable of recording content to record the content associated with the identifier.

Figure 5:
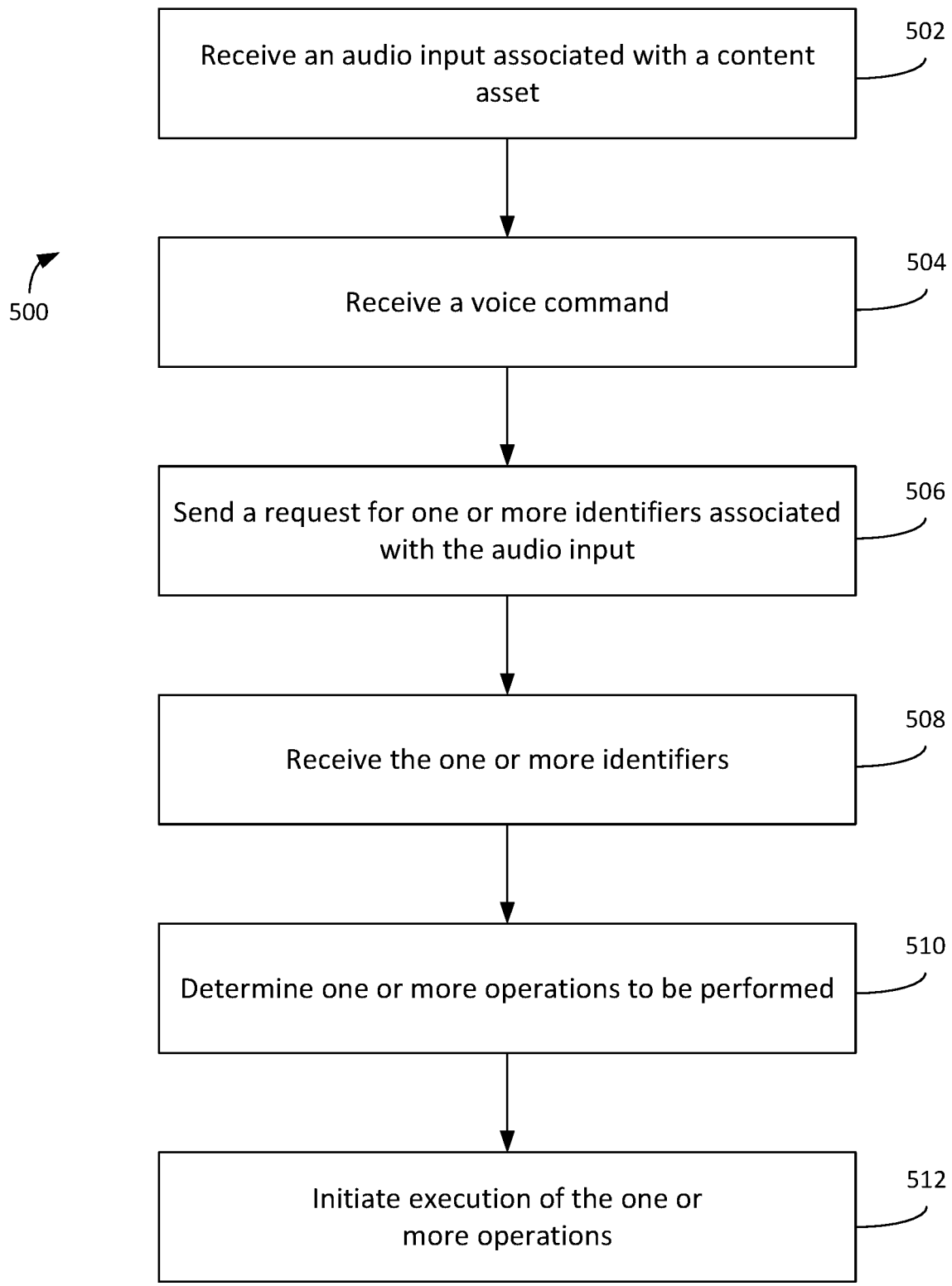
FIG. 5 is a flow chart of an example method.

FIG. 5 illustrates an example method 500 in accordance with an aspect of the disclosure. At step 502, audio data may be received at a device, such as the user device 102. The audio data may be associated with a content asset, such as a movie, television, or audio asset. The audio data may be received at the device from a first entity, such as the playback device 120. The audio data may be received at a user device such as a voice activated device. The device may be an always-on device that is configured to monitor for the presence audio signals generated by nearby devices (e.g., the playback device) or users of those devices. Additionally or alternatively, the user device may be configured to enter a "sleep" mode after a certain period of time and may not "wake" until one or more keywords are detected at the user device.

At step 504, a voice command may be received at the user device. The voice command may be received at the device from a second entity. The second entity may be different from the first entity. For example, the second entity may be a user of the device uttering the voice command. The voice command may comprise one or more keywords capable of being recognized by the device. In the example that the device has entered a sleep mode, the device may be configured to wake upon the detection of the one or more keywords. The one or more keywords may be stored by the user device in the keyword storage module which may comprise a number of keywords that are recognizable by the speech processor using, for example, pattern matching, and may allow a user to interact with content presented during playback of a content asset. For example, the keyword storage module may store a plurality of commonly spoken words for interacting with the content, such as "order," "play," and "record."

At step 506, a request for one or more identifiers associated with the audio data may be sent. The request for the one or more identifiers may be sent in response to the receipt of a voice command at the user device. Thus, upon receiving a voice command with a keyword that is capable of being recognized by the user device, the user device may be configured to "wake" from a sleep mode and to send a request for or more identifiers. The one or more identifiers may comprise, for example, at least one of an SCTE-35 packet, a unique program identifier (UID), a content identifier, or an audio watermark. Sending a request for one or more identifiers associated with the audio data may comprise sending, to the first entity, the request for the one or more identifiers associated with the audio data. However, the request for one or more identifiers may be sent to any device capable of determining one or more identifiers associated with playback of a content asset. The user device may be configured to determine, based on the voice command, a type of identifier to request from the first entity. Additionally or alternatively, the user device may be configured to send a request for any number of identifiers received within a certain time frame of the voice command, such as a request for all identifiers received thirty seconds prior to the voice command.

At step 508, the one or more identifiers may be received. The one or more identifiers may be received at the user device from the playback device that generated the audio data associated with playback of the content asset. For example, receiving the one or more identifiers may comprise receiving the one or more identifiers from the first entity. However, it is understood that the one or more identifiers may be received from any device capable of recognizing or transmitting one or more identifiers in a content asset. The user device may be configured to store a plurality of identifiers associated with a content asset for a limited period of time, such as thirty seconds. The user device may be configured to receive one or more identifiers in response to a request for a particular identifier based on the voice command. Additionally or alternatively, the user device may receive one or more identifiers in response to sending a request for all identifiers within a given time frame of the received voice command.

At step 510, an association between the voice command and an identifier may be determined. In one example, the user device may be configured to store a plurality of identifiers, for example, in the identifier storage module of the user device and to determine one or more identifiers capable of being executed by the device. Determining one or more operations capable of being executed by the device may comprise determining that one or more of the identifiers associated with the audio data were received within a given time frame of the voice command. For example, a user device may receive a voice command comprising the known keyword "order."

Upon receiving the voice command, the user device may determine that the identifier storage module has stored three identifiers in the thirty seconds prior to the voice command: a first identifier associated with a first product and received twenty-five seconds before the voice command; a second identifier associated with a television asset received fifteen seconds before the voice command; and a third identifier associated with a second product received five seconds before the voice command. The user device may determine based on the known keyword "order" that the user wishes to place an order for either the first product associated with the first identifier or the second product associated with the third identifier. The user device may further determine, since the third identifier was received closer to the voice command than the first identifier, that the user wishes to place an order for the second product associated with the third identifier.

At step 512, execution of at least one or more of the determined operations may be caused. The user device may be configured to execute an operation determined based on the voice command and the one or more identifiers stored in the user device. In the example above, the user device may be configured to place an order for the second product associated with the third identifier through an online shopping account using stored information associated with the user. The user device may be configured to generate an audio output indicative of the one or more executable operations. For example, in response to placing an order for the second product through the home shopping network, the user device may confirm that the order was placed by generating an audio output of "order for second product has been placed." Additionally or alternatively, the user device may generate an audio output confirming the voice command before executing the one or more operations, such as by querying the user "are you sure you want to order the second product?"

Figure 6:
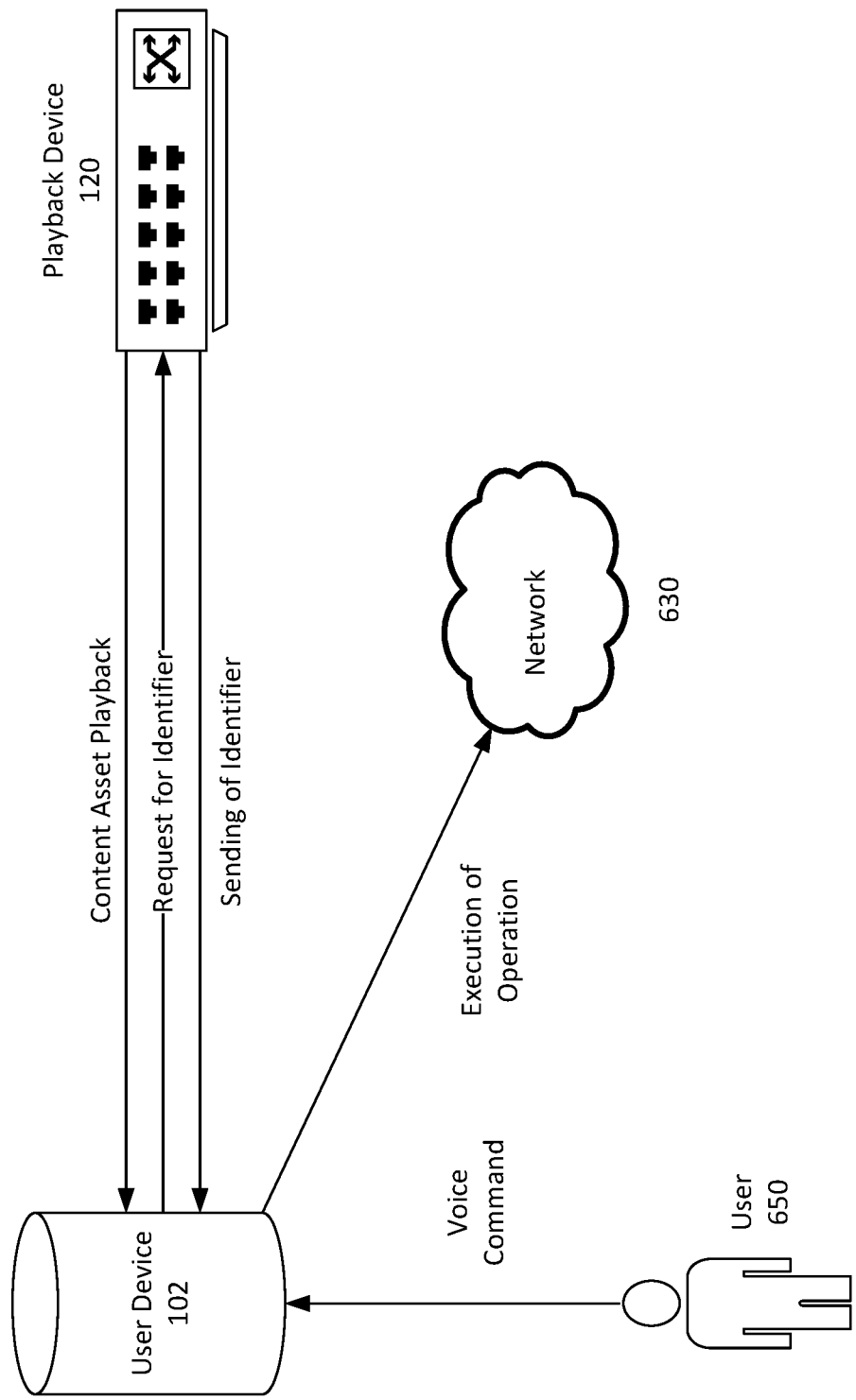
FIG. 6 is an example system operation according an aspect of the disclosure.

FIG. 6 shows an example system implementation according to an aspect of the disclosure. The playback device 120 may be configured to play back a content asset, such as a movie, television or audio asset. The playback device 120 may be in communication with a service provider such as a content or service provider and may be in connection with a television or other monitor in order to display the content asset to a user, such as user 650. The user device 102, which may be a voice activated device, may be configured to enter a "sleep" mode after a given period of time and until a voice command is detected at the user device 102. The voice command may comprise one or more keywords that are capable of being recognized by the user device 102 using speech recognition processing such as pattern matching. In response to receipt of the voice command, the user device 102 may be configured to send, to a device such as the playback device 120, a request for an identifier associated with the content asset.

The playback device 120, in response to receiving the request for the one or more identifiers, may be configured to send to the user device 102 at least one identifier. The playback device 120 may send to the user device 102 one or more identifiers based on the received voice command or one or more identifiers detected within a given time frame of the received voice command. For example, the user device 102 may receive a voice command comprising the keyword "order." The user device 102 may send to the playback device 120 a request for one or more identifiers that correspond to the keyword "order" or may send a request for one or more identifiers received within a given time frame of the keyword "order."

The playback device 120, in response to this request, may be configured to send the one or more identifiers to the user device 102. In response to receipt of the one or more identifiers, the user device 102 may be configured to execute an operation associated with the voice command. For example, the user device 102 may receive from the playback device 120 one or more product identifiers present in a content asset, and may be configured to place an order for one or more of the products associated with the identifiers by communicating with an online shopping account over the network 630.

Figure 7:
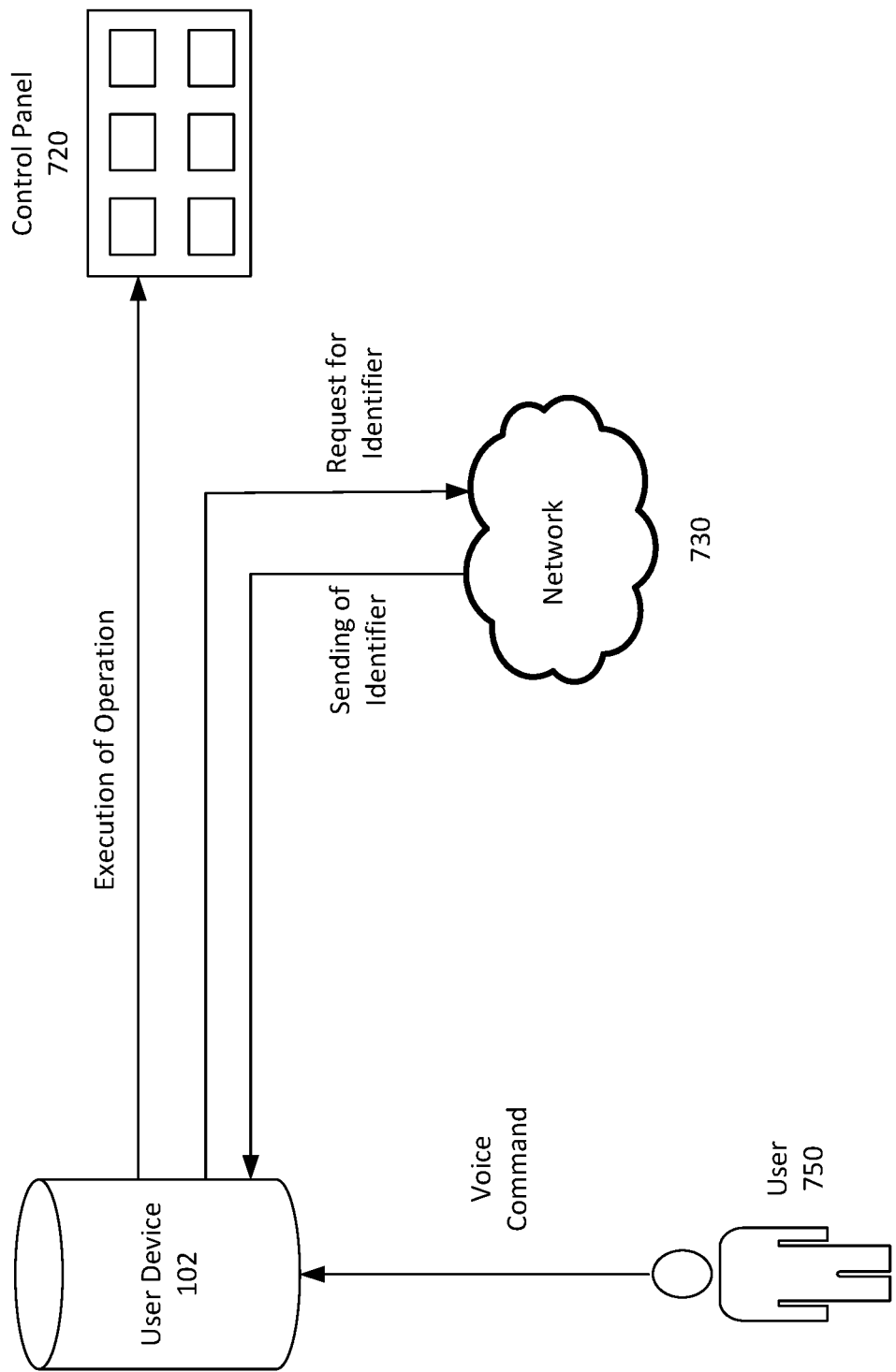
FIG. 7 is an example system operation according to an aspect of the disclosure.

FIG. 7 shows an example system implementation according to an aspect of the disclosure. A user device, such as user device 102, may be in communication with a control panel 720. The control panel 720 may be configured to control one or more of lighting, heating or air conditioning in a user's home. The user device 102 may be configured to communicate with the control panel 720 in order to execute voice commands received from a user, such as to turn on or off one or more lights in the user's home or to adjust the temperature in the user's home. For example, the user device 102 may receive from the user 750 audio data comprising the voice command "turn off that light." However, the user device 102 may not be able to determine from the voice command alone which light in the home the user is referring to.

In response to receiving the voice command "turn off that light," the user device 102 may be configured to communicate with an external network 730. The network 730 may be able to determine the condition (e.g., on, off, dimmed, etc.) of one or more light switches in the user's home, such as by communicating with a smart metering system in the home. If the network 730 determines that there is only one light in the user's home that is turned on, the network 730 may send to the user device 102 the identifier associated with that light. The user device 102 may, in turn, execute an operation associated with the received voice command by communicating with the control panel 720 to turn off the light corresponding to the received identifier. Additionally or alternatively, the network 730 may determine that there is more than one light on in the user's home and that more information is needed to execute the voice command. In response to this determination, the network 730 may send to the user device 102 a request for more information. In response to receiving this request, the user device 102 may query the user for more information, such as by generating an audio output "which light do you wish to turn off," and may receive second audio data from the user, such as "kitchen light." The user device 102 may send this response to the network 730 along with a request for an identifier associated with the kitchen light, and may receive the identifier associated with the kitchen light. Upon receiving the identifier, the user device 102 may execute the operation by sending to the control panel 720 a request to turn off the light corresponding to the identifier for the kitchen light.

Thus, the user device 102 may be configured to contact an external network such as a network 730 in order to determine context associated with a voice command. In another example, the user device 102 may receive first audio data such as playback of a content asset, and a voice command such as "show me movies with him in it." The user device 102 may send the first audio data to the network 730 where the network 730 may be configured to perform audio content recognition (ACR) processing on the first audio data in order to determine at least one of the title of the movie or a list of actors in the movie. The network 730 may send an identifier associated with the movie or an identifier associated with at least one actor in the movie to at least one of the user device 102 or the playback device 120. If there is more than one actor in the movie, the user device 102 may be configured to query the user in order to determine which actor the user is referring to. The playback device 120, upon receiving the identifier, may display via a user interface a list of movies with the actor corresponding to the received identifier.

Figure 8:
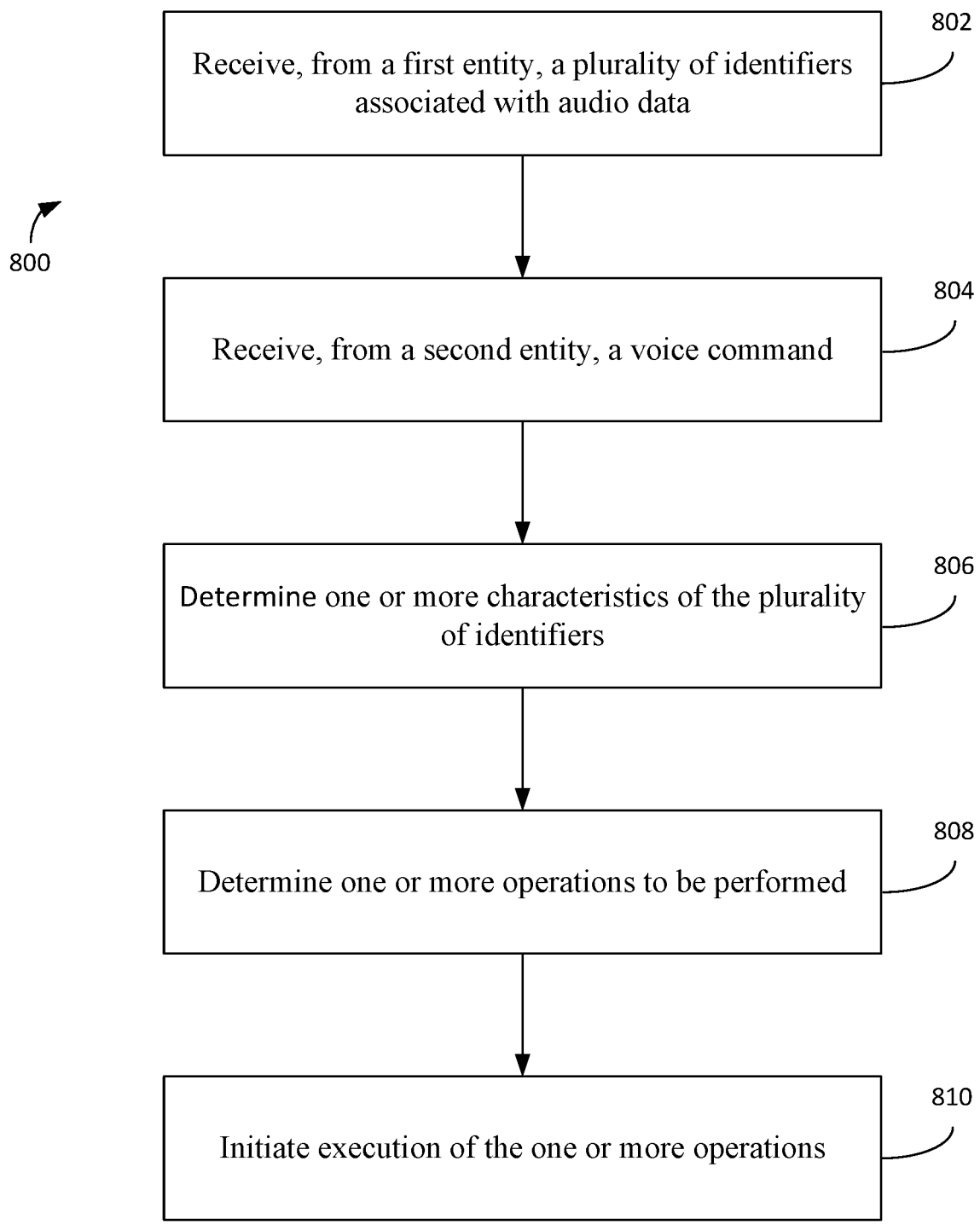
FIG. 8 is a flow chart of an example method.

FIG. 8 shows an example method according to an aspect of the disclosure. At step 802, a request for an identifier associated with audio data may be received. The request for an identifier may be received at a first device. The first device may be, for example, the playback device 120 such as a set-top box. The audio data may be received at a second device. The second device may be a user device (e.g., user device 102) such as a voice activated device. The audio data may correspond to audio generated as a result of playback of a content asset by the first device or any other device capable of presenting audio or video content to a user. The second device may be configured to send the request for the one or more identifiers in response to receipt at the second device of a voice command comprising one or more keywords. The one or more keywords may be stored by the second device in a keyword storage module of the second device which may comprise a number of keywords that are recognizable by the speech processor using, for example, pattern matching, and may allow a user to interact with content presented during playback of a content asset. For example, the keyword storage module may store a plurality of commonly spoken words for interacting with the content, such as "order," "play," and "record."

At step 804, it may be determined that the audio data comprises one or more identifiers. The one or more identifiers may comprise, for example, at least one of an SCTE-35 packet, a unique program identifier (UID), a content identifier, or an audio watermark. The one or more identifiers may correspond, for example, to a particular content asset or one or more products presented during playback of the content asset. At least one of the first device and the second device may be configured to store a plurality of identifiers associated with a given content asset. For example, the first device may be configured to receive the identifiers from the service provider prior to or during playback of the content asset. Additionally or alternatively, at least one of the first device or the second device may be configured to determine the one or more identifiers generated as a result of playback of the content asset, for example, using speech processing or an existing transcription of the content asset.

At step 806, the one or more identifiers may be sent to the second device. The second device, in response to receiving the one or more identifiers, may be configured to cause execution of an operation associated with the audio data based on a voice command received at the second device and the one or more identifiers. In an example where the received identifier corresponds to a content asset capable of being presented by the first device, the second device may send to the first device an instruction to record or playback the content asset corresponding to the identifier. In an example where the received identifier corresponds to a product presented during playback of the content asset, the second device may place an order for the product through an online shopping account associated with the user.

Figure 9:
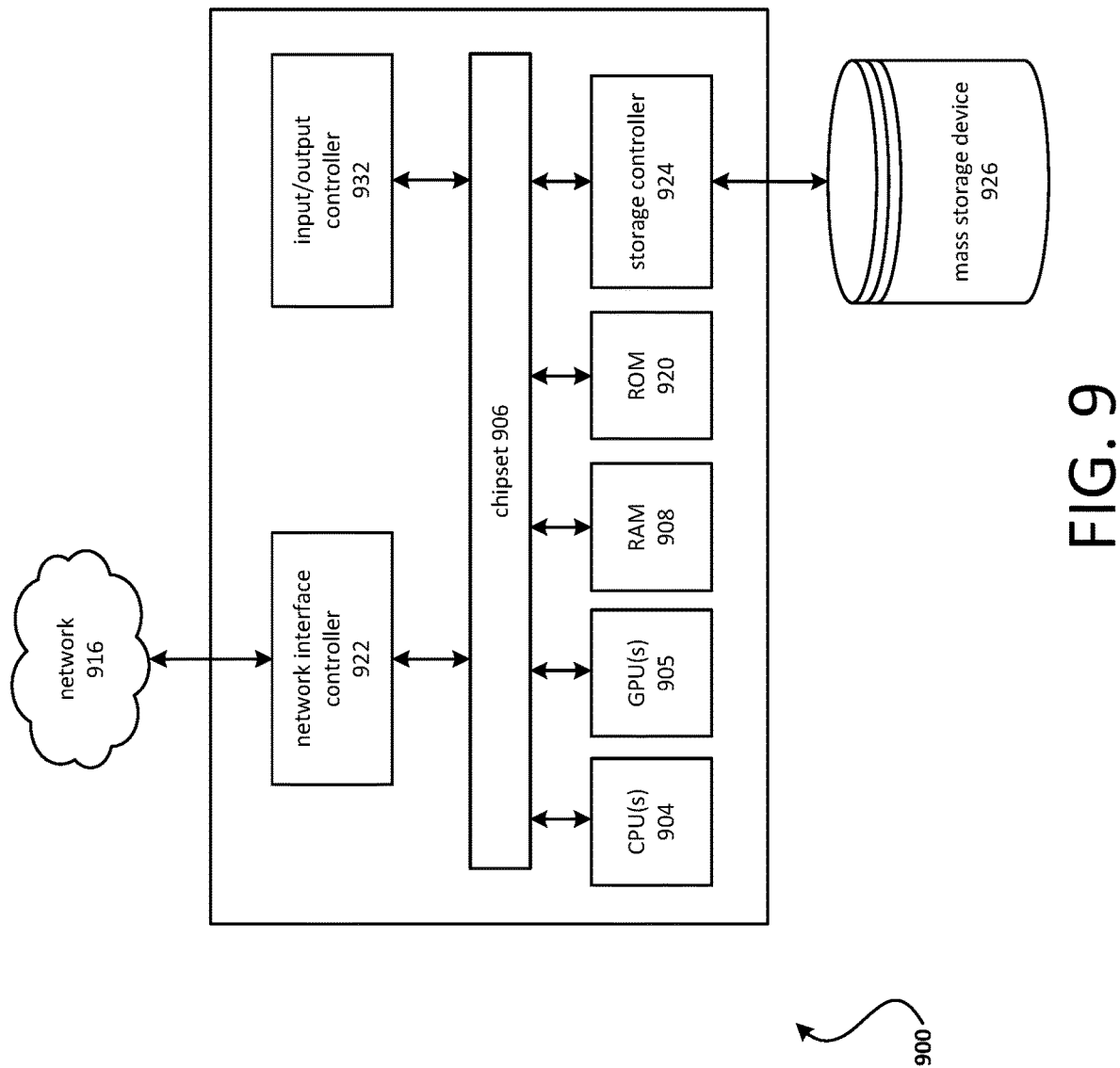
FIG. 9 is a block diagram of an example computing device.

FIG. 9 depicts a computing device that may be used in various aspects, such as the servers, modules, and/or devices depicted in FIGS. 1, 3, 5 and 6. With regard to the example architecture of FIG. 1, the voice activated device 102, computing device 110, and/or the playback device 120 may each be implemented in an instance of a computing device 900 of FIG. 9. The computer architecture shown in FIG. 9 illustrates a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 1, 5, 5 and 6.

The computing device 900 may include a baseboard, or "motherboard," which is a printed circuit board to which a multitude of components or devices may be connected by way of a system bus or other electrical communication paths. One or more central processing units (CPUs) 904 may operate in conjunction with a chipset 906. The CPU(s) 904 may be standard programmable processors that perform arithmetic and logical operations necessary for the operation of the computing device 900.

The CPU(s) 904 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 904 may be augmented with or replaced by other processing units, such as GPU(s) 905. The GPU(s) 905 may comprise processing units specialized for but not necessarily limited to highly parallel computations, such as graphics and other visualization-related processing.

A chipset 906 may provide an interface between the CPU(s) 904 and the remainder of the components and devices on the baseboard. The chipset 906 may provide an interface to a random access memory (RAM) 908 used as the main memory in the computing device 900. The chipset 906 may provide an interface to a computer-readable storage medium, such as a read-only memory (ROM) 820 or non-volatile RAM (NVRAM) (not shown), for storing basic routines that may help to start up the computing device 900 and to transfer information between the various components and devices. ROM 820 or NVRAM may also store other software components necessary for the operation of the computing device 900 in accordance with the aspects described herein.

The computing device 900 may operate in a networked environment using logical connections to remote computing nodes and computer systems through local area network (LAN) 916. The chipset 906 may include functionality for providing network connectivity through a network interface controller (NIC) 922, such as a gigabit Ethernet adapter. A NIC 922 may be capable of connecting the computing device 900 to other computing nodes over a network 916. It should be appreciated that multiple NICs 922 may be present in the computing device 900, connecting the computing device to other types of networks and remote computer systems.

The computing device 900 may be connected to a mass storage device 926 that provides non-volatile storage for the computer. The mass storage device 926 may store system programs, application programs, other program modules, and data, which have been described in greater detail herein. The mass storage device 926 may be connected to the computing device 900 through a storage controller 924 connected to the chipset 906. The mass storage device 926 may consist of one or more physical storage units. A storage controller 924 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 900 may store data on a mass storage device 926 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 926 is characterized as primary or secondary storage and the like.

For example, the computing device 900 may store information to the mass storage device 926 by issuing instructions through a storage controller 924 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 900 may read information from the mass storage device 926 by detecting the physical states or characteristics of one or more particular locations within the physical storage units.

In addition to the mass storage device 926 described herein, the computing device 900 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 900.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 926 depicted in FIG. 9, may store an operating system utilized to control the operation of the computing device 900. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 926 may store other system or application programs and data utilized by the computing device 900.

The mass storage device 926 or other computer-readable storage media may also be encoded with computer-executable instructions, which, when loaded into the computing device 900, transforms the computing device from a general-purpose computing system into a special-purpose computer capable of implementing the aspects described herein. These computer-executable instructions transform the computing device 900 by specifying how the CPU(s) 904 transition between states, as described herein. The computing device 900 may have access to computer-readable storage media storing computer-executable instructions, which, when executed by the computing device 900, may perform the methods described in relation to FIGS. 1, 3, 5 and 6.

A computing device, such as the computing device 900 depicted in FIG. 9, may also include an input/output controller 932 for receiving and processing input from a number of input devices, such as a keyboard, a mouse, a touchpad, a touch screen, an electronic stylus, or other type of input device. Similarly, an input/output controller 932 may provide output to a display, such as a computer monitor, a flat-panel display, a digital projector, a printer, a plotter, or other type of output device. It will be appreciated that the computing device 900 may not include all of the components shown in FIG. 9, may include other components that are not explicitly shown in FIG. 9, or may utilize an architecture completely different than that shown in FIG. 9.

As described herein, a computing device may be a physical computing device, such as the computing device 900 of FIG. 9. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
   receiving, at a device, a voice command;
   determining a time associated with the voice command and a type of identifier associated with the voice command;
   sending, to another device, a request for one or more identifiers that are each associated with a time within a time period before the time associated with the voice command and with the type of identifier associated with the voice command;
   receiving, from the another device, an indication of the one or more identifiers associated with the time within the time period and with the type of identifier;
   selecting, by the device, one identifier of the one or more identifiers that is associated with a time closest to the time associated with the voice command;
   determining, based on the voice command and the one identifier, an operation to be performed; and
   initiating, by the device, execution of the operation.

2. The method of claim 1, wherein the voice command comprises one or more keywords capable of being recognized by the device.

3. The method of claim 1, wherein the one or more identifiers comprise at least one of a unique program identifier, a content identifier or an audio watermark.

4. The method of claim 1, wherein the device is an always-on voice activated device.

5. The method of claim 1, wherein the another device is a playback device.

6. The method of claim 1, wherein selecting the one identifier of the one or more identifiers comprises:
   outputting the one or more identifiers; and
   receiving an indication of selection of the one identifier.

7. The method of claim 1, wherein receiving the indication of the one or more identifiers comprises receiving the indication of the one or more identifiers that were received during the time period before the time associated with the voice command.

8. The method of claim 1, wherein determining the operation to be performed comprises receiving a confirmation of the operation to be performed.

9. The method of claim 1, wherein the one or more identifiers are based on continuous recording of audio during the time period.

10. The method of claim 1, wherein the type of identifier associated with the voice command is a type associated with an object or a type associated with content.

11. A method comprising:
    receiving, at a device and from a content playback device, audio data associated with a content asset;
    receiving, at the device and from a user, a voice command;
    determining a time associated with the voice command and a type of identifier associated with the voice command;

sending a request for one or more identifiers that are each associated with a time within a time period before the time associated with the voice command and with the type of identifier associated with the voice command;

receiving an indication of the one or more identifiers associated with the time within the time period and with the type of identifier;

selecting, by the device, one identifier of the one or more identifiers that is associated with a time closest to the time associated with the voice command;

determining, based on the voice command and the one identifier, an operation to be performed; and initiating, by the device, execution of the operation.

12. The method of claim 11, wherein the device is a voice-activated device.

13. The method of claim 12, wherein the voice command comprises one or more keywords capable of being recognized by the device.

14. The method of claim 11, wherein the one or more identifiers comprise at least one of a unique program identifier, a content identifier, or an audio watermark.

15. The method of claim 11, further comprising generating an audio output indicative of the operation to be performed.

16. The method of claim 11, wherein:

sending the request for the one or more identifiers comprises sending, to the content playback device, the request for the one or more identifiers; and receiving the indication of the one or more identifiers comprises receiving, from the content playback device, the indication of the one or more identifiers.

17. The method of claim 11, wherein selecting the one identifier of the one or more identifiers comprises:

outputting the one or more identifiers; and receiving an indication of selection of the one identifier.

18. The method of claim 11, wherein receiving the indication of the one or more identifiers comprises receiving the indication of the one or more identifiers that were received during the time period before the time associated with the voice command.

19. The method of claim 11, wherein determining the operation to be performed comprises receiving a confirmation of the operation to be performed.

20. The method of claim 11, wherein the type of identifier associated with the voice command is a type associated with an object or a type associated with content.

21. A method comprising:

receiving, at a device, a plurality of identifiers associated with audio data;

receiving, at the device and from another device, a voice command;

determining a time associated with the voice command and a type of identifier associated with the voice command;

selecting, by the device and based on the time associated with the voice command, one identifier of the plurality of identifiers that is received at a time within a time period before the time associated with the voice command, wherein the one identifier of the plurality of identifiers is associated with the type of identifier associated with the voice command and is associated with a time closest to the time associated with the voice command;

determining, based on the voice command and the one identifier, an operation to be performed; and initiating, by the device, execution of the operation.

22. The method of claim 21, wherein the plurality of identifiers associated with the audio data are received from a playback device.

23. The method of claim 21, wherein the plurality of identifiers comprise at least one of a unique program identifier, a content identifier or an audio watermark.

24. The method of claim 21, wherein the device is a voice activated device.

25. The method of claim 21, wherein the voice command comprises one or more keywords capable of being recognized by the device.

26. The method of claim 21, wherein determining the operation to be performed comprises receiving a confirmation of the operation to be performed.

27. The method of claim 21, wherein the type of identifier associated with the voice command is a type associated with an object or a type associated with content.

* * * * *